(12) United States Patent
Childers

(10) Patent No.: US 11,768,298 B1
(45) Date of Patent: Sep. 26, 2023

(54) KEYLESS GPS TRACKING HANDCUFFS

(71) Applicant: Roger J. Childers, Jasper, AL (US)

(72) Inventor: Roger J. Childers, Jasper, AL (US)

( * ) Notice: Subject to any disclaimer, the term of this patent is extended or adjusted under 35 U.S.C. 154(b) by 248 days.

(21) Appl. No.: 17/366,792

(22) Filed: Jul. 2, 2021

Related U.S. Application Data

(60) Provisional application No. 63/169,158, filed on Mar. 31, 2021.

(51) Int. Cl.
*G01S 19/14* (2010.01)
*E05B 75/00* (2006.01)
*E05B 47/00* (2006.01)

(52) U.S. Cl.
CPC ............. *G01S 19/14* (2013.01); *E05B 75/00* (2013.01); *E05B 2047/0067* (2013.01); *E05B 2047/0083* (2013.01)

(58) Field of Classification Search
CPC ................................. G01S 19/14; E05B 75/00
USPC ...................................................... 342/357.52
See application file for complete search history.

(56) References Cited

U.S. PATENT DOCUMENTS

| | | | |
|---|---|---|---|
| 1,342,334 A | 6/1920 | Kruger | |
| 6,672,116 B1 | 1/2004 | Hilliard | |
| 8,839,796 B2 | 9/2014 | Reese et al. | |
| 9,064,391 B2 | 6/2015 | Vardi et al. | |
| 10,190,340 B2 | 1/2019 | Livshits et al. | |
| 10,480,909 B1 | 11/2019 | Brown | |
| 10,501,965 B1 * | 12/2019 | Chaput | .................... E05B 75/00 |
| 2002/0108406 A1 | 8/2002 | Makos et al. | |
| 2007/0289342 A1 | 12/2007 | Brooks et al. | |
| 2008/0047307 A1 | 2/2008 | Kenney | |
| 2011/0199256 A1 | 8/2011 | Chu | |
| 2014/0131435 A1 | 5/2014 | Harrington et al. | |
| 2014/0355167 A1 | 12/2014 | Reese et al. | |
| 2019/0145132 A1 * | 5/2019 | Kovac | ................. E05B 27/0003 70/16 |
| 2019/0277065 A1 | 9/2019 | Kovac | |
| 2020/0063467 A1 | 2/2020 | Caprino et al. | |
| 2020/0318395 A1 * | 10/2020 | Lee | ........................ E05B 75/00 |

FOREIGN PATENT DOCUMENTS

| | | | |
|---|---|---|---|
| CN | 102619414 | | 8/2012 |
| CN | 202970199 U | | 5/2013 |
| CN | 205936021 U | | 2/2017 |
| CN | 206971993 U | * | 2/2018 |
| CN | 108798303 A | | 11/2018 |
| KR | 20140017951 | | 2/2014 |
| KR | 101938989 | | 4/2019 |

* cited by examiner

*Primary Examiner* — Harry K Liu

(74) *Attorney, Agent, or Firm* — John Rizvi; John Rizvi, P.A.—The Patent Professor®

(57) ABSTRACT

A security cuff is disclosed. The security cuff includes a Global Positioning System (GPS) system. The GPS system is configured to provide a geographic location of a user wearing the security cuff. The security cuff further includes a double-locking restraint system, the double-locking restraint system comprising a first lock and a second lock.

15 Claims, 7 Drawing Sheets

KEYLESS GPS TRACKING HANDCUFFS

CROSS REFERENCE TO RELATED APPLICATION

This application claims the benefit of U.S. Provisional Application 63/169,158, filed Mar. 31, 2021, which is incorporated herein by reference in its entirety.

FIELD OF THE INVENTION

The present invention relates generally to restraining systems, and more particularly, to a security cuff which may have GPS tracking and/or a double-locking system.

BACKGROUND OF THE INVENTION

The conventional handcuff used to transport prisoners has not changed much in the past few decades. Unfortunately, this has become problematic since keys to unlock such handcuffs can be easily purchased by the general public and prisoners have learned techniques for bypassing and/or picking handcuffs, even while in prison. Cuff keys have been smuggled into prisons. Some common materials, such as paper clips, bobby pins, toothbrushes, etc. have also been used to pick handcuff locks.

Transporting prisoners presents a particularly high security risk of prisoner escape during transport. Even if prisoners are handcuffed, for the reasons described above, the security risk of escape remains relatively high. Allowing escapees to re-enter society in such manner is undesirable because the escapees can recommit criminal acts. Also, additional security personnel resources and time are expended to attempt to re-capture such escapees, which may ultimately be unsuccessful. Recapture efforts can also present a high security risk to the general public in the area that the prisoner is able to escape to.

Accordingly, there is need for a solution to at least one of the aforementioned problems.

SUMMARY OF THE INVENTION

The present invention is directed to a security cuff which may have a Global Positioning System (GPS) tracking and/or a double-locking system. In a first implementation of the invention, the security cuff may include a GPS system configured to provide a geographic location of a user wearing the security cuff. The security cuff may include a double-locking restraint system. The double-locking restraint system includes a first lock and a second lock. The double-locking restraint system may be a multi-level locking system.

In a second aspect, one of the first lock and the second lock operates as a secondary locking system, which allows the other one of the first lock and the second lock to operate as a primary locking system that allows the security cuff to be opened. For example, in some embodiments, unlocking the second lock allows the first lock to be unlocked and the first lock may allow the security cuff to open. Alternatively, in some embodiments, unlocking the first lock allows the second lock to be unlocked and the second lock may allow the security cuff to open.

In yet another aspect, the double-locking restraint system may comprise two, independent locks, each of which may be unlocked in any order to open the security cuff.

In yet another aspect, the first lock is a combination lock. The combination lock is configured to unlock when a sequence of characters/alphanumeric characters are input into the combination lock. The combination lock may include a keypad or other user input device. The keypad may include a set of buttons configured to operate a first locking element and/or to unlock the first locking element when a predetermined sequence of buttons on the keypad are pressed. The predetermined sequence of buttons may be pre-programmed into e.g., a microprocessor and may comprise e.g., a n-character input, where n can by any number but preferably at least a 6, e.g., a 6-digit input for a high number of potential combinations.

In another aspect, the second lock comprises a second locking element, the second locking element configured to unlock according to a detector device. The detector device is remote and/or physically separate from the security cuff.

In another aspect, the detector device may be configured to one or more of: detect the security cuff; upon detection, verify whether the security cuff is a particular security cuff associated with the particular detector device; and upon verification, unlock the second locking element.

In another aspect, the second locking element is specific to the detector device. For example, in some embodiments, the detector device may comprise a radio frequency identification device (RFID) reader. The RFID reader may be configured to read/detect an RFID tag embedded in the security cuff to within a certain distance of proximity. In this manner, the RFID reader, presumably still in the possession of security personnel may be required to be within a close distance to the security cuff for the first lock to be unlocked. This may prevent escapees that are a far distance away from security personnel to be able to even attempt to unlock the first lock.

In an aspect, the RFID tag may store an identifier in memory. The detector device may be configured to: read the identifier associated with the RFID tag in the security cuff to verify whether the identifier matches to an identifier stored in a memory at the detector device. In a further aspect, upon verification that the identifiers match, the detector device is configured to unlock the second lock and thereby allow the first lock to be attempted to be unlocked. For example, in one embodiment, upon verification by the detector device that the identifiers match, the keypad may be activated/enabled thereby allowing user inputs to be actually received and processed by the processing circuitry within the security cuff in order to unlock the first lock and open the security cuffs.

In one aspect, the security cuff may include a processor/microprocessor or other circuitry which may be configured to implement the dependency logic, such as only activating (e.g., supplying power thereto, receiving inputs from, etc.) the keypad if the RFID reader transmits a signal verifying that the identifiers match.

Such microprocessor or other circuitry may be in communication with elements of both the first and second locks to implement the dependency logic. For example, the microprocessor may be connected to the keypad and also the RFID tag comprised in the security cuff.

In one aspect, the detector device may a handheld detector device, such as an RFID reader "swipe" card.

In one aspect, the security cuff is key-less.

In an aspect, the security cuff is one of: a pair of security cuffs, a pair of security feet cuffs and an ankle cuff having embedded therein the GPS system and the double-locking restraint system.

In a second implementation, a security cuff system is provided. The security cuff system comprises a security cuff and a remote detector device. The security cuff comprises a GPS system configured to provide a geographic location of a user wearing the security cuff; and a double-locking restraint system, the double-locking restraint system comprising a first lock and a second lock.

In an aspect of the second implementation, the remote detector device may be configured to detect the security cuff, verify an identifier associated with the security cuff and upon verification, unlock the second lock. The unlocking of the second lock provides access to the second lock and/or allows the first lock to be unlocked.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
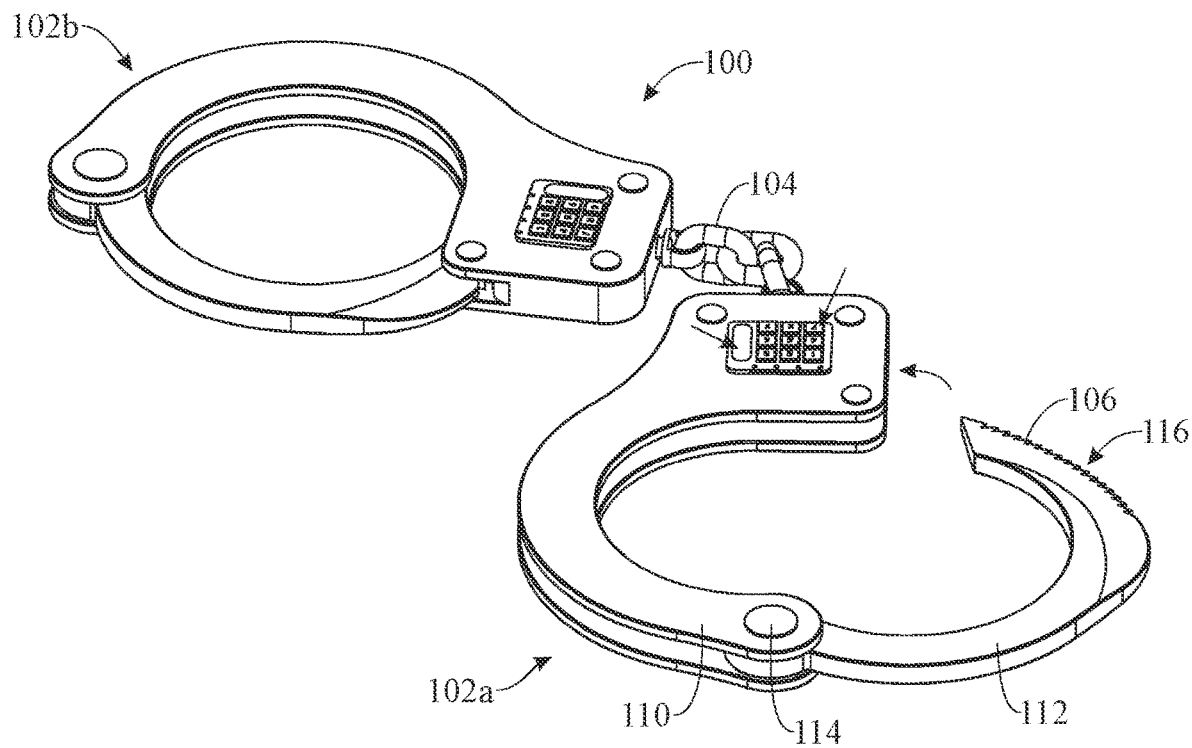
FIG. 1 presents a perspective, top view of a security cuff including a combination lock in accordance with a first illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "coupled," as used herein, is defined as connected, although not necessarily directly, and not necessarily mechanically.

The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system.

It is to be understood that the disclosed embodiments discussed herein are merely exemplary of the invention, which can be embodied in various forms. Moreover, the titles used herein are merely descriptive of the content contained, or figures described, therein. The present invention provides a novel and efficient security cuff system and method of using the same.

Figure 5:
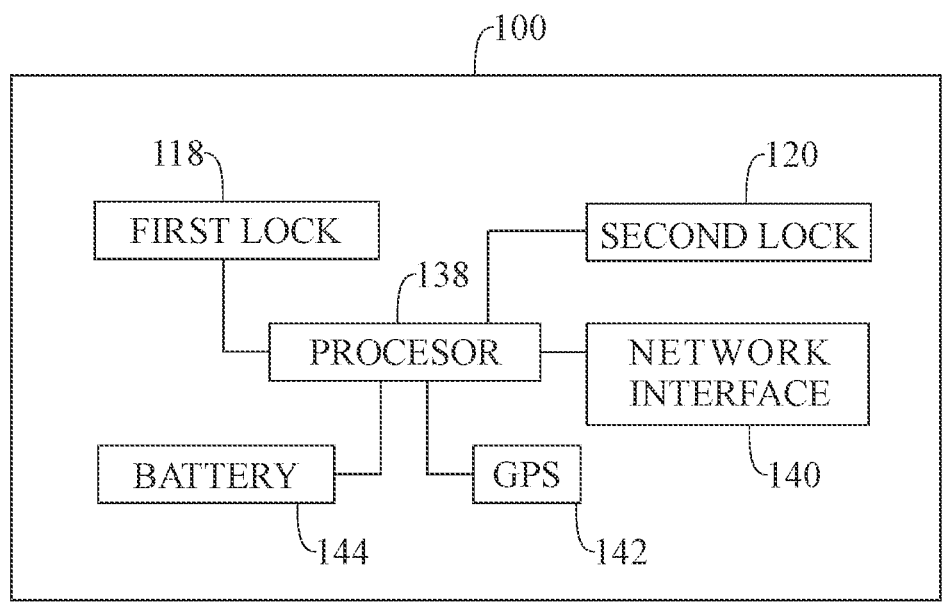
FIG. 5 is a block diagram illustrating example elements, such as locking and electrical elements, in the security cuff in accordance with an embodiment of the present invention.

Although, the process flowcharts described herein, such as FIG. 5, shows a specific order of executing the process steps, the order of executing the steps may be changed relative to the order shown in certain embodiments. Also, two or more blocks shown in succession may be executed concurrently or with partial concurrence in some embodiments. Certain steps may also be omitted for the sake of brevity.

Shown throughout the figures, the present invention is directed toward a security cuff. In some embodiments, the security cuff may include a GPS system built into the security cuff, as well as a double-locking restraint system including an individual locking system. The double-locking restraint system may include a primary locking system and a secondary locking system, such as a combination lock and a physically separate activation/detector device, such as a wand or swipe card designed for the combination restraint. The physically separate activation device (e.g., wand, swipe card, etc.) may detect, verify, and open/enable a secondary locking feature specific to the activation/detector device.

Referring initially to FIGS. 1-4, a security cuff 100 is illustrated in accordance with a first exemplary embodiment of the present invention. The security cuff 100 is shown here as a pair of handcuffs 102a, 120b. In other embodiments, the security cuff 100 may be formed as other types of physical restraint systems, such as feet cuffs or ankle cuffs.

The handcuffs 102a, 102b are formed as bracelets and may be made of metal material, such as steel or any other hard material. The security cuff 100 includes a coupler 104 coupling the handcuffs 102a, 102b together. The coupler 104 is shown as a chain, but other embodiments of known couplers such as for examples hinges are also contemplated.

Figure 2:
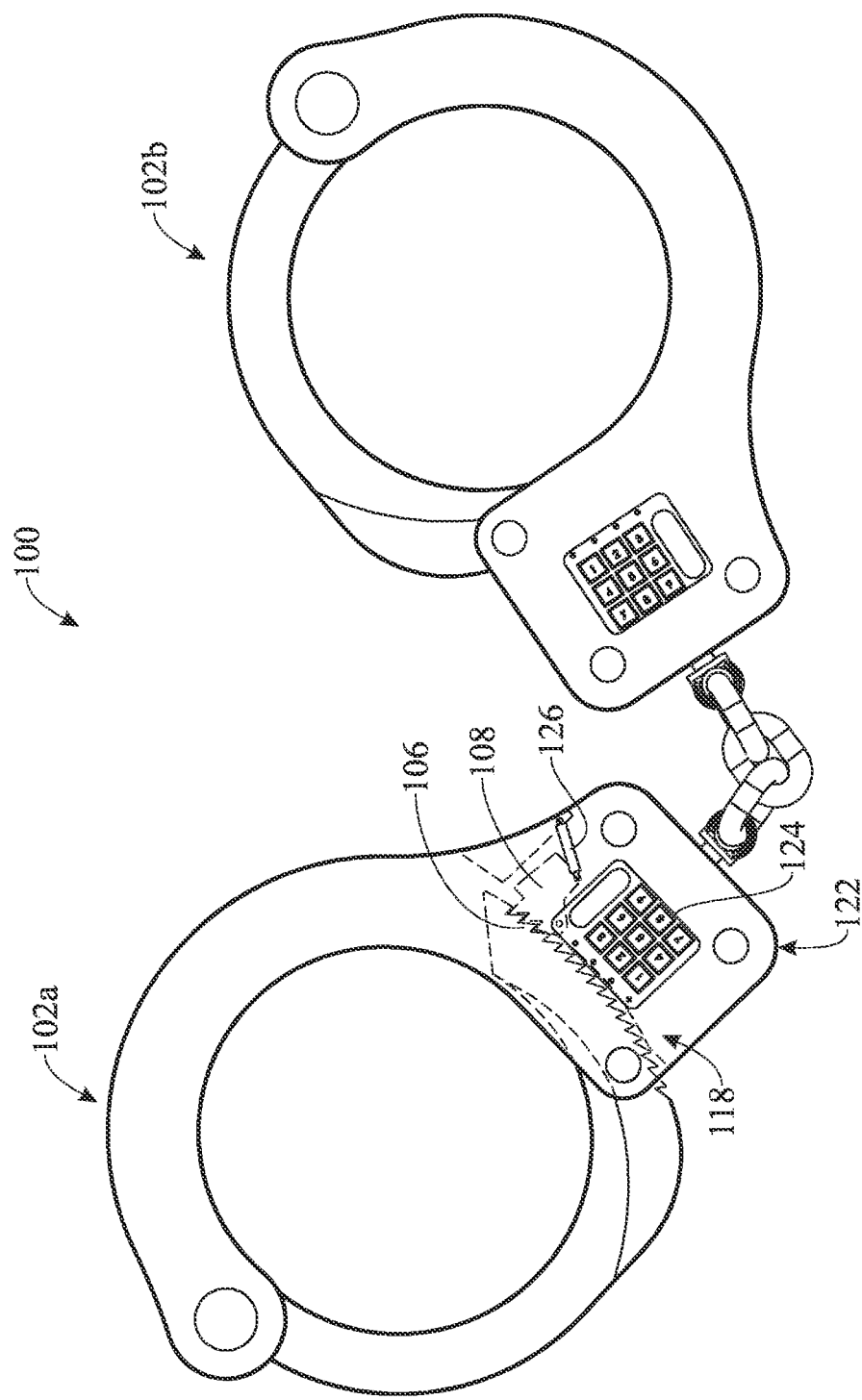
FIG. 2 presents a plan view of the security cuff illustrated in FIG. 1, illustrating an example locking mechanism in a locked arrangement in accordance with one illustrative embodiment of the present invention.

The security cuff 100 includes ratchet teeth 106. The ratchet teeth 106 may be formed as inclined teeth sized and/or shaped to matingly engage a first locking element 108 in a locking manner. The first locking element 108 is shown in FIG. 2 as a locking bar or pawl sized and/or shaped to matingly receive the ratchet teeth 106 in a locking manner.

The handcuffs 102a, 102b may be identical and/or similar in construction. Thus, for the sake of brevity only one handcuff 102a is described herein, although the description may also apply to the second handcuff 102b.

The handcuff 102a includes a double-strand part 110 and a single-strand part 112 coupled together via a pivot 114. The ratchet teeth 106 are formed at an end 116 of the single-strand part 112. The single-strand part 112 can rotate the ratchet teeth 106, via the pivot 114, toward the first locking element 108, e.g., pawl.

Unlike conventional handcuffs, the security cuff 100 is key-less. The security cuff 100 may include a double-locking restraint system comprising a first lock 118 and a second lock 120 (see FIG. 4). The first and second locks 118, 120 may be disposed on different parts of the handcuff 102. FIGS. 1-4 show the first and second locks 118, 120 on opposite sides of the handcuff 102a.

The first lock 118 may be embedded in a base 122 of the handcuff 102a. The first lock 118 may include the first locking element 108 which locks the ratchet teeth 106 such that the handcuff 102a cannot be opened.

The first lock 118 may further include a combination lock, which may be connected to the pawl. The combination lock may be configured to unlock when a sequence of characters/alphanumeric characters (e.g., numbers, letters and/or symbols) are input into the combination lock. The combination lock may include a keypad 124 or another user-input device. The keypad 124 may include a set of buttons configured to operate the first locking element 108 and/or to unlock or release the first locking element 108 when a predetermined sequence of buttons on the keypad 124 are pressed, such as a specific numerical sequence-based combination or pin code. The predetermined sequence of buttons may be pre-programmed into the respective handcuff 102a and may include e.g., a n-character input, where n can by any number but preferably at least a 6, e.g., a 6-digit input for a high number of potential combinations. In alternative embodiments, the combination lock may be implemented as a dial, knob, or other known combination lock types.

The first lock 118 further comprises a locking spring 126 which, in a locked arrangement of the first lock 118, continuously biases the first locking element 108 in a direction toward the ratchet teeth 106, as can be seen in FIG. 2.

Figure 3:
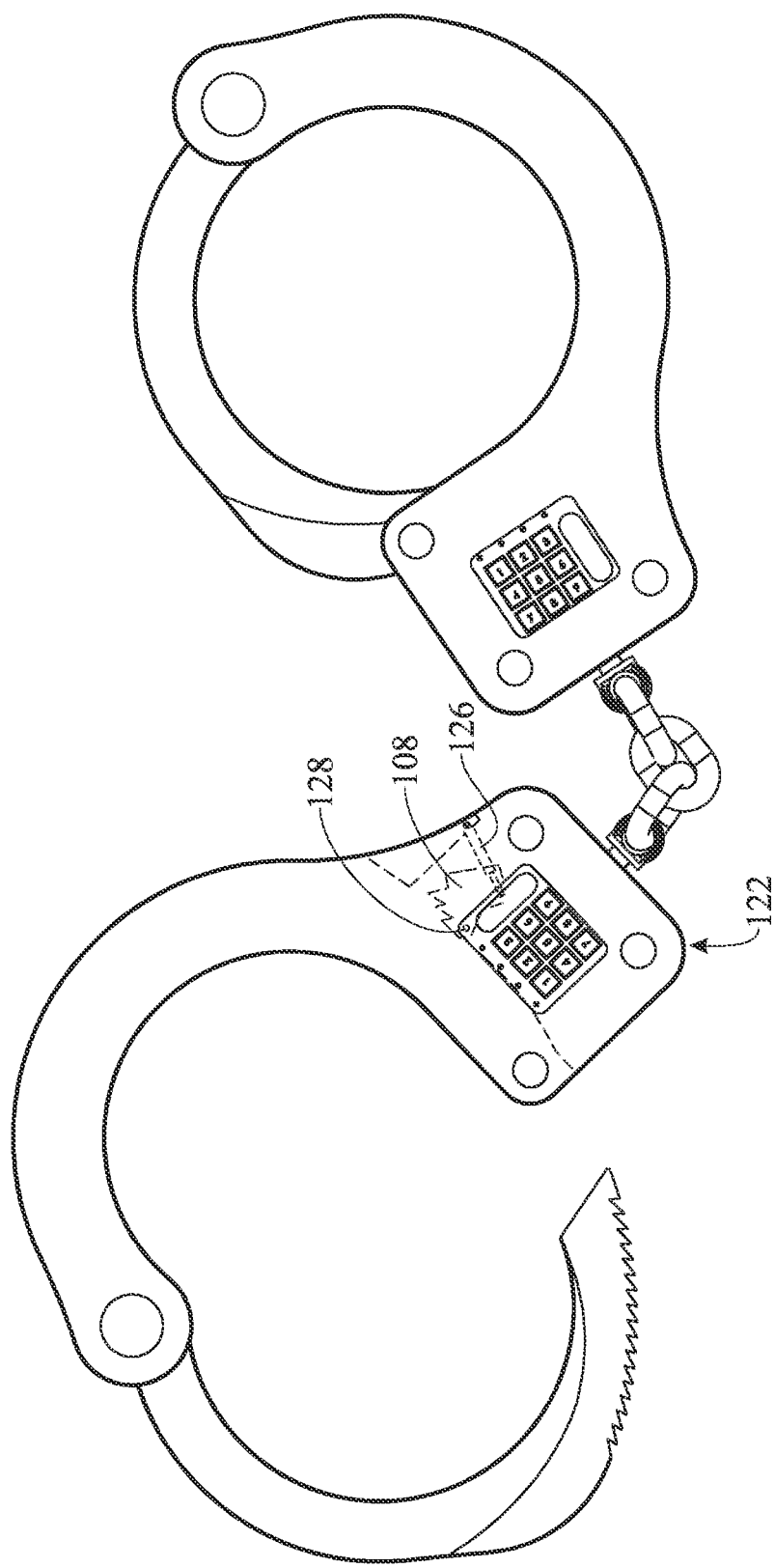
FIG. 3 presents a plan view of the security cuff illustrated in FIG. 1, illustrating the example locking mechanism in an unlocked arrangement in accordance with one illustrative embodiment of the present invention.

When the correct predetermined sequence of buttons is pressed on the keypad 124, the first locking element 108 is configured to move in a direction away from the ratch teeth 106, as can be seen in FIG. 3, allowing the ratch teeth 106 to be moved to an unlocked arrangement to open the handcuff 102a. As a result of the correct combination being input into the keypad 124, a sufficient force is applied to overcome the biasing force of and to compress the locking spring 126. With the locking spring 126 compressed, the first locking element 108 is configured to move in a direction away from the ratchet teeth 106 thereby allowing the ratch teeth 106 to be pivoted outwardly, via a locking pivot 128, to outside of the base 122 and thereby allowing the handcuff 102a to be opened.

In some embodiments, the force that is activated by the correct combination may be from e.g., a locking motor, or other electrical and/or mechanical source. The force from such sources may configured to be sufficient to overcome the biasing force and compress the locking spring 126 and/or to move, translate or rotate the first locking element 108 in the direction away from the ratchet teeth 106. The other handcuff 102b may operate identically.

The security cuff 100 may be a multi-level locking system, which may further include a secondary locking system. For example, in some embodiments, one of the first lock 118 and the second lock 120 operates as a secondary locking system, which allows the other one of the first lock 118 and the second lock 120 to operate as a primary locking system. The primary locking system may allow the security cuff 100 to be opened when unlocked; while the secondary locking system may activate/enable the primary locking system so that it can be unlocked. For example, in some embodiments, unlocking the second lock 120 allows the first lock 118 to be unlocked and the first lock 118 may allow the security cuff 100 to open. Alternatively, in some embodiments, unlocking the first lock 118 allows the second lock 120 to be unlocked and the second lock 120 may allow the security cuff 100 to open.

Figure 4:
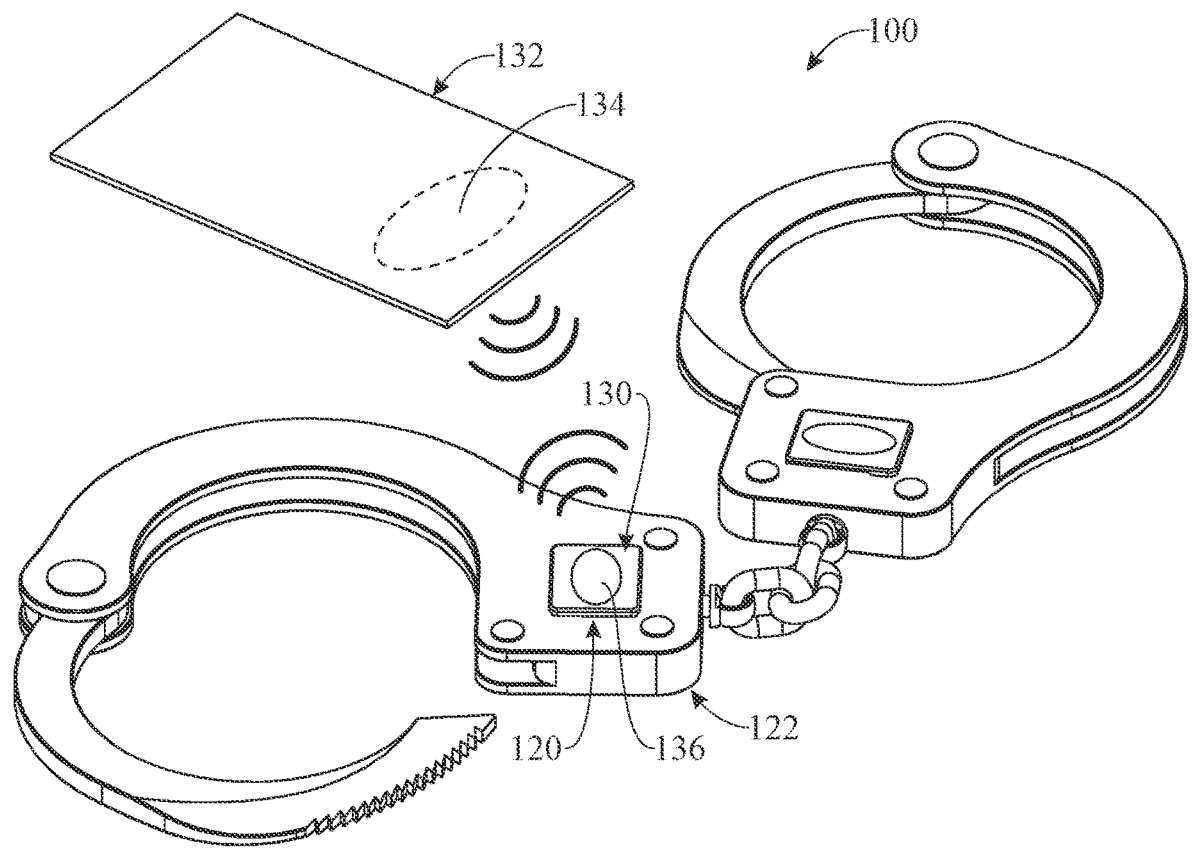
FIG. 4 presents a perspective, bottom view of the security cuff illustrated in FIG. 1 further including a secondary lock in accordance with an embodiment of the present invention.

Referring now primarily to FIG. 4, the second lock 120 is illustrated according to one illustrative embodiment. The second lock 120 is shown disposed on an opposite side of the base 122 as the first lock 118. The second lock 120 comprises a second locking element 130. The second locking element 130 is configured to unlock the second lock 120 according to a detector device 132. The detector device 132 is remote and/or physically separate from the security cuff 100. The detector device 132 is preferably in the possession of security personnel transporting the detainee.

The detector device 132 is configured to one or more of: detect a presence of the security cuff 100; upon detection, verify whether the security cuff 100 is a particular security cuff 100 associated with the particular detector device 132; and upon verification, unlock the second locking element 130. The detector device 132 may perform detection and/or verification wirelessly using radio signal technology, as shown in FIG. 4.

The second locking element 130 at the handcuff 102a is specific to, unique to or otherwise associated with the detector device 132. For example, in some embodiments, the detector device 132 may comprise a radio frequency identification device (RFID) reader 134. The RFID reader 134 may include transmitter and receiver antennas and be configured to communicate with an RFID element 136 at the security cuff 100. The RFID reader 134 may be configured to read/detect a radio signal transmitted by the RFID element 136 embedded in the security cuff 100 to within a certain small distance of proximity. In this manner, the RFID reader 134, presumably still in the possession of security personnel may be required to be within a very close distance to the security cuff 100 in order for it to be unlocked. This may prevent escapees that are a far distance away from being able to even attempt to unlock the first lock 118.

In some preferred embodiments, the RFID reader 134 and RFID element 136 may be configured to operate at a distance that may be less than a distance that security personnel are conventionally from prisoners in a transport vehicle, such as a bus, so that it can only be activated/enabled intentionally and not merely due to a typical proximity distance. For example, the RFID reader 134 may be embedded in a card that is configured to be swiped or tapped on the RFID element 136 at the security cuff 100 in order to be unlocked.

The RFID element 136 may be an RFID or NFC tag, which may store a unique identifier in memory. The detector device 132 may be configured to: read the identifier which may be stored in memory at the RFID tag to verify whether the identifier matches to an identifier stored in a memory at the detector device 132. Upon verification that the identifiers match, the detector device 132 is configured to transmit a radio signal that unlocks the second lock 120 and thereby allows the first lock 118 to be attempted to be unlocked. For example, in one embodiment, upon verification by the detector device 132 that the identifiers match (e.g., are identical), the keypad 124 may be activated/enabled or turned on thereby allowing user inputs to be actually received and processed by a processor (see FIG. 5) at the security cuff 100 in order to unlock the first lock 118 and thereby open the handcuff 102*a* as described above.

The security cuff 100 includes a processor 138, which may be a microprocessor or other circuitry (see FIG. 5 for example) and which may be configured to implement any of the processes described herein, such as the dependency logic described herein. For example, the processor may be configured to execute instructions stored in memory to e.g., only activate/enable (e.g., supplying power thereto, receiving or processing user inputs therefrom, etc.) the keypad 124 if the RFID reader 134 transmits a verification radio signal (which is received by a receiver antenna at the security cuff 100).

In one embodiment, the verification radio signal may be transmitted by the RFID reader 134 transmit antenna with a unique radio signature or a unique code that the processor/microprocessor recognizes as a verification that the identifiers match and therefore the second locking element 130 can be unlocked.

In some embodiments, the second locking element 130 may be circuitry that restricts power supply to the keypad 124, or the processor configured to ignore keypad 124 user inputs, or any other feature that otherwise renders the first lock 118 as disabled/not able to be unlocked; until the dependency condition related to the second lock 120 is met, for example, until a correct verification radio signal is received from the detector device 132.

Such processor or other circuitry may be in communication with elements of both the first and second locks 118, 120 to implement the dependency logic. For example, the processor may be connected to the keypad 124 and also the RFID tag comprised in the security cuff 100; when the RFID tag receives the verification radio signal from the detector device 132 (e.g., upon a valid swipe), the RFID tag may communicate that to the processor and responsive to that, the processor may then enable the keypad 124 (e.g., switch power on to the keypad 124 or stop ignoring user inputs, etc.).

In some embodiments, the verification radio signal may be unique/specific to the detector device 132 such that only the particular detector device 132 may be used with the particular security cuff 100. In addition to the matching identifiers, this may further prevent hacking attempts since both the identifiers and the verification radio signals are designed to be unique and device specific.

Other security features may be implemented to prevent hacking attempts, such as, for example, encryption schemes, varying the frequencies at which the antennas are tuned such that not all detector devices 132 and matching security cuffs 100 are on operating on the same frequency, etc.

FIG. 5 is a block diagram illustrating an example of hardware components, which may electrical and/or mechanical, and which may be included in the security cuff 100 according to one embodiment. The security cuff 100 includes a processor 138, such the processor described herein above.

The processor 138, may be a microprocessor, a central processing unit and/or a controller. The processor 138 may include integrated circuitry, firmware, Field Programmable Gate Arrays FPGAs), Application Specific Integrated Circuitry (ASIC) and/or other types of processing components configured to execute instructions according to one or more of the processes disclosed herein. The processor 138 may be configured to access (e.g., write to and/or read from) a memory, which may store software code and/or computer executable instructions to perform one or more of the processes disclosed herein. The memory may include any kind of volatile and/or nonvolatile memory, such as, for example, RAM (Random Access Memory) and/or ROM (Read-Only Memory) and/or EPROM (Erasable Programmable Read-Only Memory) and/or a cache and/or buffer memory in the processor 138. The memory may store the identifier and verification code described above. The processor 138 may be configured to implement the dependency logic described above and/or one or more of the steps described in the flowchart in FIG. 7. The processor 138 may be configured to control the locking motor, power supply, keypad 124, RFID tag and any of the other electrical-based locking features described herein.

The security cuff 100 may include a network interface 140 configured to communicate over wireless communication links, such as RF signals, cellular networks, the Internet, etc. The network interface 140 may include one or more transmitter and receiver antennas configured to send and receive radio signals over the various networks described herein. The network interface 140 may include radio circuitry configured to process the radio signals described herein according to know digital signal processing techniques.

The security cuff 100 further includes a GPS system 142 and a battery 144. The battery 144 is configured to supply power to the electrical components in the security cuff 100. The GPS system 142 is configured to provide a geographic location of a user wearing the security cuff 100, such as an escapee. The GPS system 142 may comprise receiver and transmitter antennas configured to receive radio signals representing GPS coordinate information and also transmit geographic location information to another device, such as a remote server, a mobile device configured as a GPS tracking system and/or a detainee tracking system at a security facility.

Figure 6:
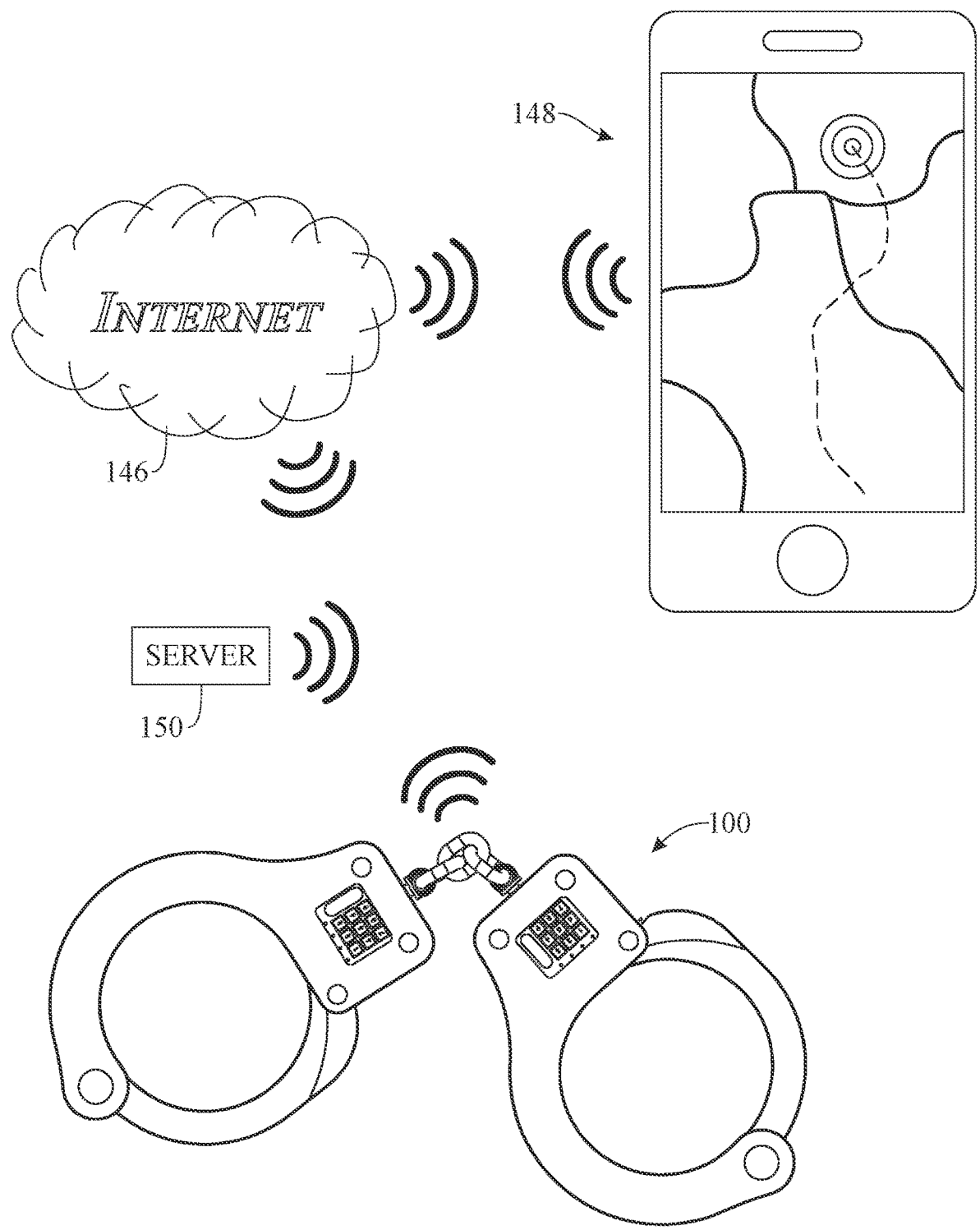
FIG. 6 presents block diagram of the security cuff illustrated in FIG. 1 within a wireless system including a wireless connection with a software application ("app) operating on a smart phone.

Referring to FIG. 6, there is illustrated a block diagram of an example network operating environment for the apparatuses and methods of the present invention. Various electronic devices are connected over one or more networks. The electronic devices can be personal computers, mobile cellular telephones/smart phones, computer tablets, servers, the security cuff 100 and the like.

The electronic devices may communicate via a wired (e.g., cable, phone line, and fiber optic) or wireless communication links, such as radio waves that may be transmitted and received over a network, such as a cellular network having a multitude of nodes, such as cellular towers for receiving and transmitting radio signals over the cellular network. The electronic devices and the cellular network may also communicate with other wide area networks (WAN), such as the Internet 146, via communication links that may be wired (e.g., cable, phone line, and fiber optic) and/or wireless (e.g., radio signals). Many other wired and wireless connections are known in the art and can be used with the present invention.

In some embodiments, a mobile cellular telephone 148 may operate a software app that is configured to receive the geographic location information from the security cuff 100 and display the geographic location information via a map graphical interface. Accordingly, security personnel can use the mobile cellular telephone 148 as a tracking system. In other embodiments, such GPS tracking software may be implemented on a personal computer or other non-mobile computing system, rather than a mobile cellular telephone 148.

In some embodiments, a server 150 may be configured to receive, via the Internet, information from one or more of the mobile cellular telephone 148 and the security cuff 100, such as the GPS coordinates or commands. For example, security personnel may be able to program the identifiers and combinations/codes associated with the security cuff 100 described herein via the app. The server 150 may service client requests from the mobile cellular telephone 148 and/or security cuff 100.

Figure 7:
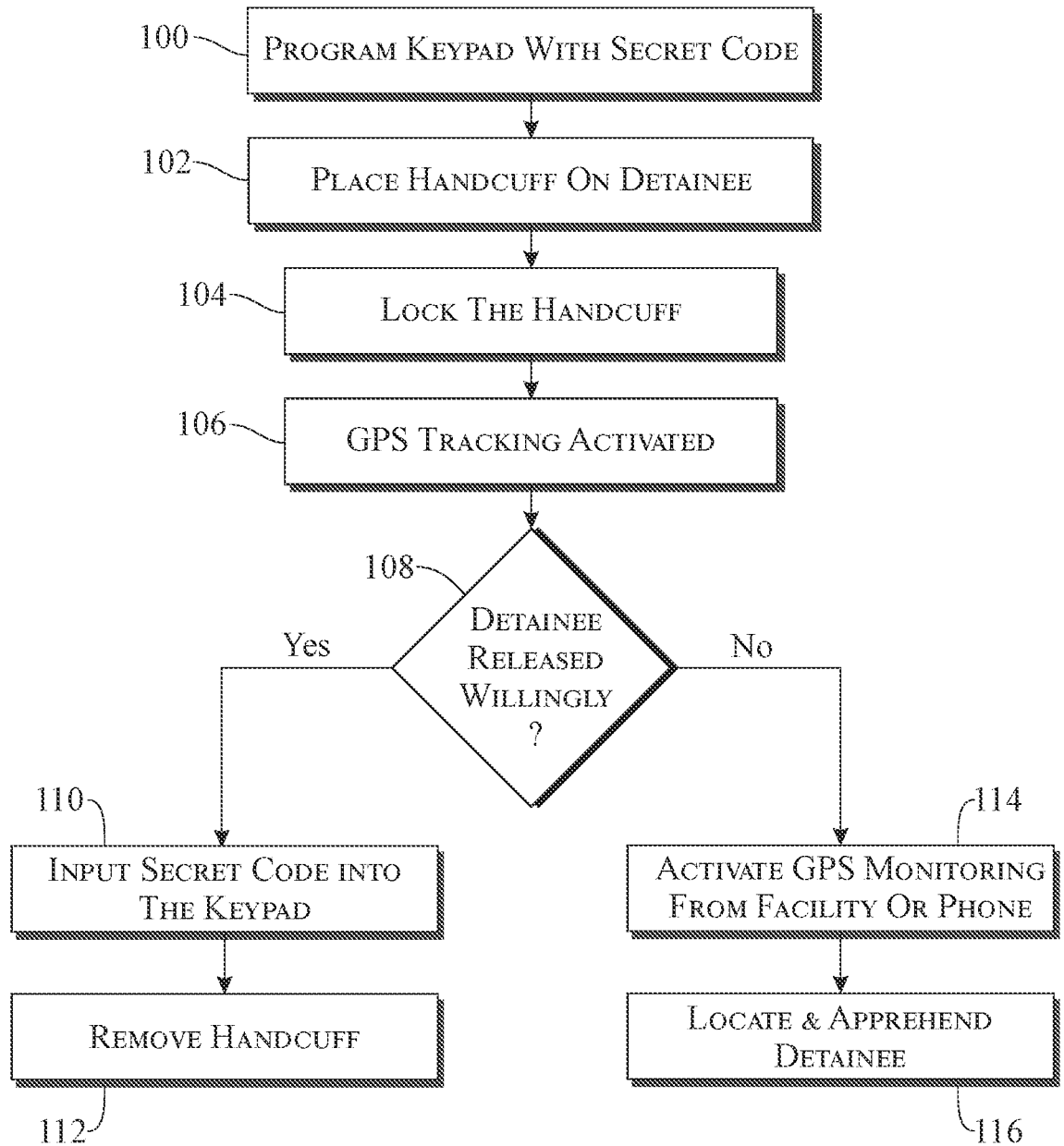
FIG. 7 presents a flowchart of an example method of using the security cuff illustrating in FIG. 1 according to an illustrative embodiment of the present invention.

FIG. 7 illustrates an example method of using the security cuff 100 according to one embodiment of the present invention. In step 100, security personnel may program a keypad with a secret code, such as a 6-digit pin. In step 102, the security cuff 100 may be placed on the detainee. In step 104, the security cuff 100 may be locked. In step 106, GPS tracking may be activated. In step 108, it may be determined whether the detainee is released willingly.

If the detainee is released willingly, in step 110, the security personnel may unlock the security cuff 100, such as by unlocking the first lock 118 and the second lock 120 as described above. For example, the security personnel may swipe the detector device 132 over the RFID element 136 to enable/activate the keypad 124 and then input the secret code into the keypad 124. In step 112, the security cuff 100 may then be opened and removed.

On the other hand, if the detainee is not willingly released, in step 114, security personnel may activate GPS monitoring using e.g., the app on the mobile cellular telephone 148 or from a facility computer. In step 116, the detainee may be located and apprehended with the assistance of the GPS monitoring information. In addition, even if the detainee is adept at picking conventional handcuff locks, the detainee will not be able to unlock the security cuff 100 because the detainee is not in possession of the secret code required to be input into the keypad 124 to unlock the first lock 118 and is also not in possession of the detector device 132 required to unlock the second lock 120 thereby enabling the first lock 118. Accordingly, the detainee is less likely to be able to blend in with the general public and will be physically disadvantaged due to the restraints.

A novel and inventive security cuff has been described, which may include a GPS system built into the security cuff, as well as a double-locking restraint system including an individual locking system having a combination lock and a secondary locking device. The secondary locking device may include a physically separate activation/detector device, such as a wand or swipe card designed for the combination restraint. The physically separate activation device (e.g., wand, swipe card, etc.) may detect, verify, and open/enable a secondary locking feature specific to the activation device.

Alternative embodiments are contemplated in which one or more of the first lock and the second lock may be different than the locks described herein above. For example, in alternative embodiments, the first and/or second locks may be magnetic, Bluetooth® or biometric-based locks, rather than RFID, keypad and/or ratchet and pawl-based.

Further, an alternative embodiment may provide an arrangement in which the double-locking restraint system may comprise two or more, independent locks, each of which may be unlocked in any order to open the security cuff.

In some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A security cuff comprising:
   a Global Positioning System (GPS) system, the GPS system configured to provide a geographic location of a user wearing the security cuff;
   a double-locking restraint system, the double-locking restraint system comprising a first lock and a second lock; wherein one of the first lock and the second lock operates as a secondary locking system, which allows the other one of the first lock and the second lock to operate as a primary locking system that allows the security cuff to be opened;

a pair of handcuffs, wherein the first lock is disposed on a first handcuff of the pair of handcuffs, and the second lock is disposed on a second handcuff of the pair of handcuffs; wherein the first handcuff comprises a first locking element and the second handcuff comprises a second locking element, and each of the first handcuff and the second handcuff comprise a respective double-strand part and a respective single-strand part coupled together by a respective pivot;

a coupler for coupling the first handcuff and the second handcuff together;

a first set of ratchet teeth, the first set of ratchet teeth formed to matingly engage with the first locking element, and wherein the respective single-strand part can rotate the first set of ratchet teeth via the respective pivot toward the first locking element; and a second set of ratchet teeth, the second of ratchet teeth formed to matingly engage with the second locking element, and wherein the respective single-strand part can rotate the second set of ratchet teeth via the respective pivot toward the second locking element.

2. The security cuff of claim 1, wherein the first lock further comprises a first base into which the first handcuff is embedded, and the second lock further comprises a second base into which the second handcuff is embedded.

3. The security cuff of claim 1, wherein the first lock comprises a first combination lock and the second lock comprises a second combination lock.

4. The security cuff of claim 3, wherein the first lock further comprises a first locking spring which, in a locked arrangement of the first lock, continuously biases the first locking element in a direction toward the first set of ratchet teeth, and the second lock further comprises a second locking spring which, in a locked arrangement of the second lock, continuously biases the second locking element in a direction toward the second set of ratchet teeth.

5. The security cuff of claim 4, wherein the first combination lock and the second combination lock are configured to unlock when a respective sequence of inputs are provided thereto.

6. The security cuff of claim 1, wherein the second locking element is configured to unlock according to a detector device associated therewith.

7. The security cuff of claim 6, wherein the detector device is remote from the security cuff.

8. The security cuff of claim 6, wherein the detector device is configured to detect the security cuff, and upon detection, verify whether the security cuff is a particular security cuff associated with the particular detector device, and upon verification, unlock the second locking element.

9. The security cuff of claim 6, wherein the detector device is a radio frequency identification device (RFID) reader configured to detect an RFID tag embedded in the security cuff to within a certain distance of proximity.

10. The security cuff of claim 9, wherein the security cuff further comprises:

a memory; and wherein the RFID tag stores an associated identifier, and the detector device is configured to read the associated identifier of the RFID tag in the security cuff and verify whether the associated identifier matches to an identifier stored by the detector device in the memory.

11. The security cuff of claim 10, wherein upon verification that the identifiers match, the detector device is configured to unlock the second lock and thereby allow the first lock to be attempted to be unlocked.

12. A security cuff comprising:

a Global Positioning System (GPS) system, the GPS system configured to provide a geographic location of a user wearing the security cuff; and a double-locking restraint system, the double-locking restraint system comprising a first lock and a second lock, the first lock comprising a first combination lock and the second lock comprising a second combination lock, and wherein one of the first lock and the second lock operates as a secondary locking system, which allows the other one of the first lock and the second lock to operate as a primary locking system that allows the security cuff to be opened; and a pair of handcuffs, wherein the first lock is disposed on a first handcuff of the pair of handcuffs, and the second lock is disposed on a second handcuff of the pair of handcuffs.

13. The security cuff of claim 12, wherein the first handcuff comprises a first locking element and the second handcuff comprises a second locking element, and each of the first handcuff and the second handcuff comprise a respective double-strand part and a respective single-strand part coupled together by a respective pivot.

14. The security cuff of claim 13, further comprising:

a first set of ratchet teeth, the first set of ratchet teeth formed to matingly engage with the first locking element, and wherein the respective single-strand part can rotate the first set of ratchet teeth via the respective pivot toward the first locking element;

a second set of ratchet teeth, the second of ratchet teeth formed to matingly engage with the second locking element, and wherein the respective single-strand part can rotate the second set of ratchet teeth via the respective pivot toward the second locking element; and wherein the first lock further comprises a first locking spring which, in a locked arrangement of the first lock, continuously biases the first locking element in a direction toward the first set of ratchet teeth, and the second lock further comprises a second locking spring which, in a locked arrangement of the second lock, continuously biases the second locking element in a direction toward the second set of ratchet teeth.

15. A security cuff comprising:

a Global Positioning System (GPS) system, the GPS system configured to provide a geographic location of a user wearing the security cuff;

a double-locking restraint system, the double-locking restraint system further comprising:

a first lock comprising a first combination lock and a first locking spring;

a second lock comprising a second combination lock and a second locking spring;

a pair of handcuffs, wherein the first lock is disposed on a first handcuff of the pair of handcuffs, and the second lock is disposed on a second handcuff of the pair of handcuffs, wherein the first handcuff comprises a first locking element and a first base, and the second handcuff comprises a second locking element and a second base, and each of the first handcuff and the second handcuff comprise a respective double-strand part and a respective single-strand part coupled together by a respective pivot, and the first lock being embedded in the first base, and the second lock being embedded in the second base of the second handcuff;
a coupler for coupling the first handcuff and the second handcuff together;
a first set of ratchet teeth, the first set of ratchet teeth formed to matingly engage with the first locking element, and wherein the respective single-strand part can rotate the first set of ratchet teeth via the respective pivot toward the first locking element;
a second set of ratchet teeth, the second of ratchet teeth formed to matingly engage with the second locking element, and wherein the respective single-strand part can rotate the second set of ratchet teeth via the respective pivot toward the second locking element;
wherein the first locking spring, in a locked arrangement of the first lock, continuously biases the first locking element in a direction toward the first set of ratchet teeth, and the second locking spring, in a locked arrangement of the second lock, continuously biases the second locking element in a direction toward the second set of ratchet teeth; and
wherein one of the first lock and the second lock operates as a secondary locking system, which allows the other one of the first lock and the second lock to operate as a primary locking system that allows the security cuff to be opened, and the first combination lock and the second combination lock are configured to unlock when a respective sequence of inputs are provided thereto.

* * * * *